(12) United States Patent
Fujibayashi

(10) Patent No.: US 8,941,606 B2
(45) Date of Patent: Jan. 27, 2015

(54) ELECTRONIC APPARATUS USING TOUCH PANEL AND SETTING VALUE MODIFICATION METHOD OF SAME

(75) Inventor: Toshihiko Fujibayashi, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 243 days.

(21) Appl. No.: 13/395,717

(22) PCT Filed: Sep. 15, 2010

(86) PCT No.: PCT/JP2010/065950
§ 371 (c)(1),
(2), (4) Date: Mar. 13, 2012

(87) PCT Pub. No.: WO2011/034097
PCT Pub. Date: Mar. 24, 2011

(65) Prior Publication Data
US 2012/0176332 A1    Jul. 12, 2012

(30) Foreign Application Priority Data

Sep. 17, 2009    (JP) .................................. 2009-215633

(51) Int. Cl.
*G06F 3/041*    (2006.01)
*G09G 5/00*    (2006.01)
*G06F 3/033*    (2013.01)
*G06F 3/048*    (2013.01)
(Continued)

(52) U.S. Cl.
CPC ........ *G06F 3/04883* (2013.01); *G06F 3/04847* (2013.01); *H04M 1/72519* (2013.01); *H04M 2250/22* (2013.01)

USPC ........... 345/173; 345/156; 345/157; 715/830; 715/863

(58) Field of Classification Search
CPC ... G06F 3/041; G06F 3/0484; G06F 3/04847; G06F 3/0488
USPC ........... 345/156, 157, 173–178; 715/830, 863
See application file for complete search history.

(56) References Cited

U.S. PATENT DOCUMENTS 5,598,187 A * 1/1997 Ide et al. ....................... 345/158
5,903,229 A * 5/1999 Kishi .............................. 341/20
(Continued)

FOREIGN PATENT DOCUMENTS

EP    1615109    1/2006
JP    2004-028678    1/2004
(Continued)

OTHER PUBLICATIONS

International Search Report, PCT/JP2010/065950; Dec. 7, 2010.
(Continued)

*Primary Examiner* — Ilana Spar
(74) *Attorney, Agent, or Firm* — Young & Thompson

(57) ABSTRACT

An electronic device includes a touch panel, and a controlling unit which detects a user touch operation of drawing a circular trajectory on the touch panel and a size of a circular portion surrounded by the circular trajectory on the touch panel, calculates an aspect ratio of the circular portion with reference to the longitudinal direction and the horizontal direction on the touch panel, inputs the calculated aspect ratio of the circular portion as control information of the electronic device, and changes a setting value of the electronic device according to the input aspect ratio of the circular portion.

20 Claims, 4 Drawing Sheets

(a) a/b=1.5
(SOUND VOLUME IS 1.5 TIMES)

(b) a/b=2
(SOUND VOLUME IS TWICE)

(c) a/b=0.5
(SOUND VOLUME IS 0.5 TIMES)

(d) a/b=0.25
(SOUND VOLUME IS 0.25 TIMES)

(51) Int. Cl.
  *G06F 3/0488* (2013.01)
  *G06F 3/0484* (2013.01)
  *H04M 1/725* (2006.01)

(56) References Cited

U.S. PATENT DOCUMENTS

| | | | |
|---|---|---|---|
| 7,519,223 B2 | 4/2009 | Dehlin et al. | |
| 7,719,523 B2* | 5/2010 | Hillis | 345/173 |
| 8,139,043 B2 | 3/2012 | Hillis | |
| 8,692,792 B2 | 4/2014 | Hillis | |
| 2010/0127994 A1 | 5/2010 | Aono et al. | |
| 2010/0245277 A1* | 9/2010 | Nakao | 345/173 |

FOREIGN PATENT DOCUMENTS

| | | |
|---|---|---|
| JP | 2005-348036 | 12/2005 |
| JP | 2007-207110 | 8/2007 |
| JP | 2007-240964 | 9/2007 |
| JP | 2007-317159 | 12/2007 |
| JP | 2008-48105 | 2/2008 |
| WO | 2006127466 | 11/2006 |
| WO | WO 2008/041485 | 4/2008 |

OTHER PUBLICATIONS

Extended European Search Report dated Apr. 4, 2014, with English Translation; Application No. 10817210.7.

* cited by examiner

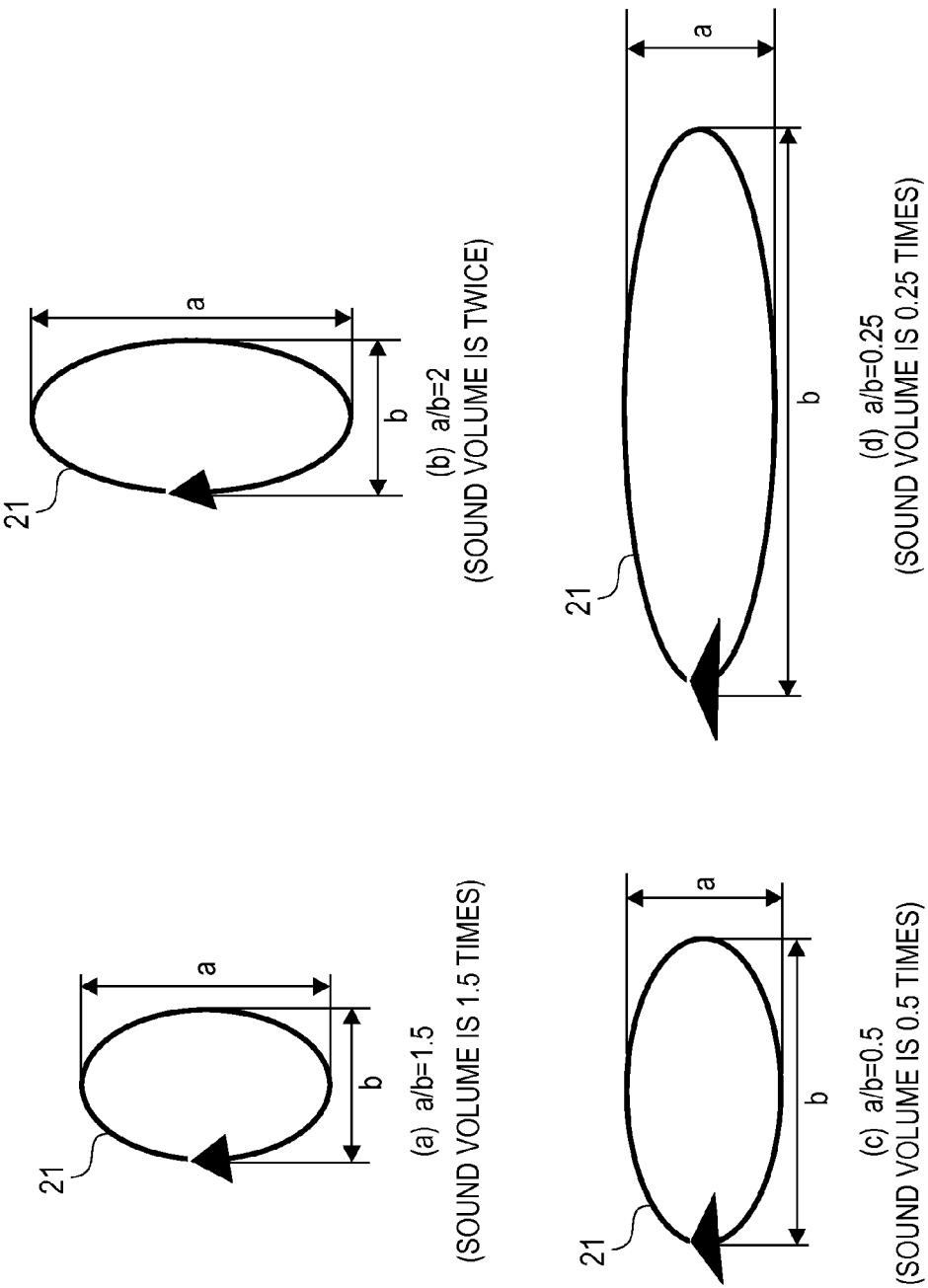

ELECTRONIC APPARATUS USING TOUCH PANEL AND SETTING VALUE MODIFICATION METHOD OF SAME

TECHNICAL FIELD

The present invention relates to an electronic apparatus (or device) such as portable terminal and portable music player using a touch panel, and its setting value modification (or changing) method for changing setting values such as sound volume setting value.

BACKGROUND ART

In recent years, information terminals such as cell phone using a touch panel have increased. Particularly, buttons other than the touch panel have been minimized for such information terminals. Typically, in the electronic device capable of being input via a touch panel, such as portable music player or cell phone, a user contacts the touch panel to change a sound volume setting value of voice or video data. By way of example, the setting values of sound volume and playback position may be controlled from a slide bar in the touch panel provided on a display part of the electronic device.

The following related arts are known as the electronic device using a touch panel.

For example, Patent Literature 1 describes an acoustic device which sets a sound volume-up region and a sound volume-down region to be spaced from each other in a part overlapping on a sound volume adjustment region image displayed on a display part in a touch panel, sets a plurality of linearly-adjacent sound volume adjustment regions between both the regions, detects an object contact on the regions, and changes an acoustic signal such that a sound volume output from an acoustic output device depending on the detection result is any of sound volumes classified into multiple stages. According to this, there can be provided an acoustic device which enables a user to easily adjust a desired sound volume level when the touch panel is used to adjust the sound volume level.

Patent Literature 2 describes an input operation device which detects a pressing force on a touch surface of a touch panel and controls a reporting unit based on report contents corresponding to the detected pressing force. According to this, there can be provided an input operation device capable of improving user operability.

Patent Literature 3 describes a display device in which two display screens mounting touch panels thereon are adjacently arranged, the display device displaying image data with the two display screen as one screen, detecting a touch point position on each touch panel of the two display screens, and displaying the image data in an enlarged or reduced manner such that a coordinate position of each touch point coincides with each coordinate position in the displayed image data on the two display screens in response to a motion of the detected touch point. According to this, there can be provided a display device capable of easily enlarging/reducing the displayed image by use of the touch panel provided in each display screen when a plurality of display screens are adjacently arranged to enlarge the entire display size.

Patent Literature 4 describes an input device for an electronic device which executes predetermined functions, such as sound volume adjustment function, of inputting a predetermined one-stroke handwriting (such as clockwise circle or counterclockwise circle) from a touch panel, comparing and analyzing a direction changing trend of the input handwriting, and increasing the sound volume for the clockwise circle of the handwriting or decreasing the sound volume for the counterclockwise circle based on the comparing and analyzing of the direction changing trend. According to this, there can be provided an input device which is simple and convenient for operations suitable for operation interface.

CITATION LIST

Patent Literature

{PTL 1} Japanese Patent Application Laid-Open No. 2008-48105
{PTL 2} Japanese Patent Application Laid-Open No. 2007-207110
{PTL 3} Japanese Patent Application Laid-Open No. 2007-240964
{PTL 4} Japanese Patent Application Laid-Open No. 2007-317159

SUMMARY OF INVENTION

Technical Problem

As described above, an electronic device using a touch panel can control setting values of sound volume, playback position and the like from a slide bar on the touch panel provided on a display part. In this case, the changing of the setting values through the touch panel operation is in principle through an operation of button or slide bar while viewing the panel. Thus, a knob or button of the slide bar needs to be operated while viewing the touch panel to control setting values of sound volume, playback position and the like from a slide bar.

For the operation, since a blind operation may be performed in many devices for the button operation not using the touch panel in an electronic device such as cell phone, the blind operation is similarly desired for the button operation using the touch panel. For example, since the sound volume adjustment of a portable music player is frequently made, it is important for the user to be able to make a change without viewing the screen.

However, the above Patent Literatures 1 to 4 do not necessarily consider an easy change in setting value of sound volume even in the blind state.

For example, in Patent literature 1 or Patent Literature 2, a setting value is changed through the touch panel operation, but the changing of the setting value needs the viewing of the touch panel and thus the blind operation is difficult.

In Patent Literature 3, although two points are operated for enlargement and reduction, if one hand holds an electronic device while the other hand is in pocket or holds a bag, in many cases only the thumb can generally operate the electronic device since other fingers are used to grip the electronic device. When a stylus is used, two styluses need to be prepared.

Further, in Patent Literature 4, the sound volume is increased or decreased by clockwise circle or counterclockwise circle of the one-stroke handwriting, but in this case, the user needs to operate many times for adjusting the desired sound volume, and the desired sound volume is difficult to easily adjust by one operation.

It is an object of the present invention to solve above problems and provide an electronic device using a touch panel and its setting value changing method capable of easily changing setting values of sound volume and the like even in a blind state.

Solution to Problem

According to a first aspect of the present invention, there is provided an electronic device using a touch panel including: a touch panel; and a controlling unit which detects a user operation of drawing a circular trajectory on the touch panel and a size of a circular portion surrounded by the circular trajectory on the touch panel, calculates an aspect ratio of the circular portion with reference to a longitudinal direction and a horizontal direction on the touch panel, inputs the calculated aspect ratio of the circular portion as control information of the electronic device, and changes a setting value of the electronic device according to the input aspect ratio of the circular portion.

According to a second aspect of the present invention, there is provided a setting value changing method for an electronic device using a touch panel, wherein a controlling unit, detects a user operation of drawing a circular trajectory on the touch panel and a size of a circular portion surrounded by the circular trajectory on the touch panel, calculates an aspect ratio of the circular portion with reference to the longitudinal direction and the horizontal direction on the touch panel, inputs the calculated aspect ratio of the circular portion as control information of the electronic device, and changes a setting value of the electronic device according to the input aspect ratio of the circular portion.

Advantage Effects of Invention

According to the present invention, there can be provided a setting value changing method for an electronic device using a touch panel capable of easily changing setting values of sound volume and the like even in a blind state through a touch operation of drawing a circular trajectory on the touch panel.

BRIEF DESCRIPTION OF DRAWINGS

{FIGS. 4(a) to 4(d)} Diagrams explain a relationship between an aspect ratio a/b of a circle and a changed value of the sound volume setting value.

DESCRIPTION OF EMBODIMENT

Next, an electronic device using a touch panel and its setting value changing method according to an embodiment of the present invention will be described below in detail with reference to the drawings.

Figure 1:
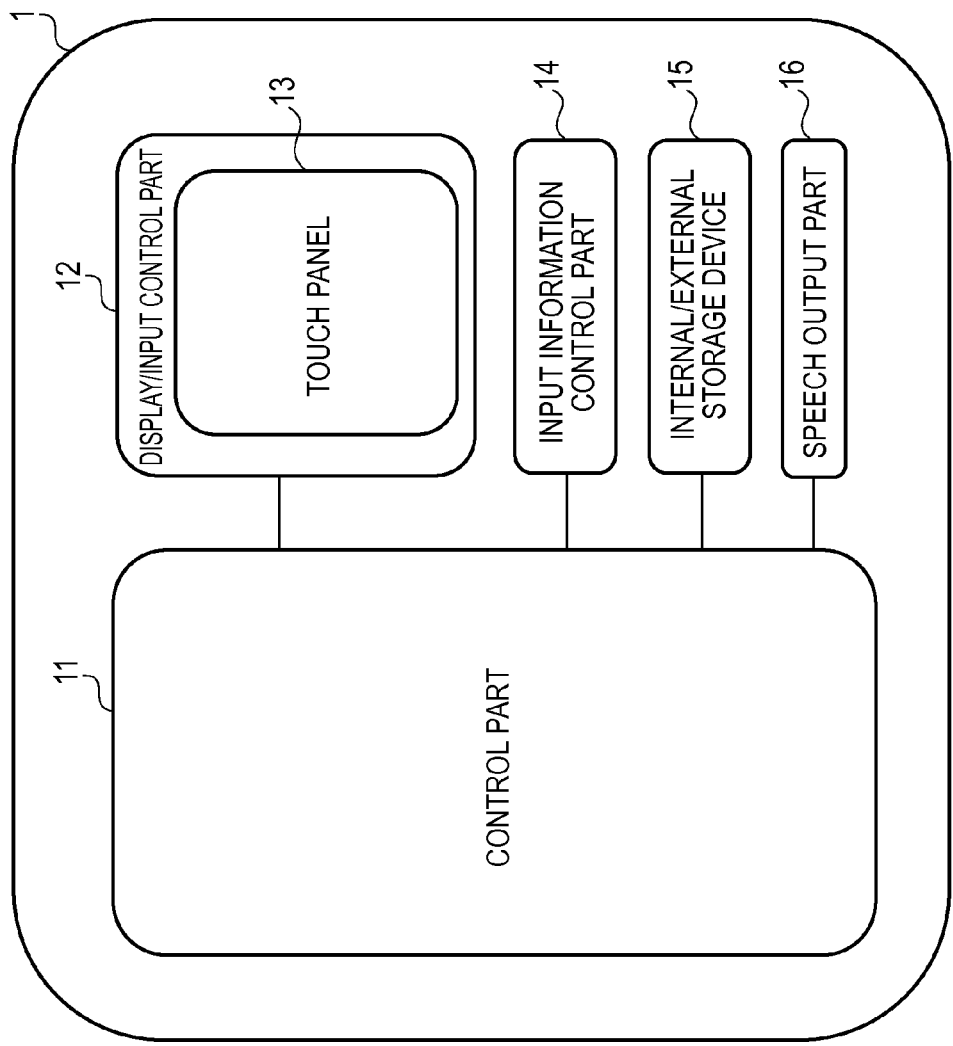
{FIG. 1} A schematic block diagram shows a structure of an electronic device using a touch panel according to an embodiment of the present invention.

FIG. 1 shows an exemplary structure of a terminal (cell phone) 1 as an electronic device using a touch panel. The terminal 1 shown in FIG. 1 includes a control part 11, a display/input control part 12, a touch panel 13 configuring the display part, an input information control part 14, an internal/external storage device (such as memory) 15, and a speech output part 16. Additionally, when the terminal 1 is a cell phone, for example, well-known components such as a wireless communication part for enabling verbal communication, and a speech input part are included therein.

The touch panel 13 is directed for specifying a position on the display screen which a user's finger contacts, and any systems usable in electronic devices may be applicable, such as well-known resistive system and electrostatic capacity system. The internal/external storage device 15 may be any storage device usable in electronic devices, such as well-known memory (ROM (Read Only Memory)/RAN (Random Access Memory)). The control part 11, the display/input control part 12 and the input information control part 14 may be individually provided or integrally provided if the parts configure a controlling unit of the present invention and each function is achievable.

The control part 11 is configured of a microcontroller (microprocessor) having a CPU (Central Processing Unit) operating under program control, and controls operation timings and the like of the respective parts (the respective devices) inside the terminal 1 according to control program instructions preset in the memory (not shown).

The display/input control part 12 passes a signal (operation signal) in response to a user operation (touch operation) on the touch panel 13 as input information to the control part 11, and displays various items of information based on decision result information of the touch operation from the control part 11 on the touch panel 13.

The input information control part 14 decides whether a user operation on the touch panel 13 is an operation of drawing a circular (including true circle (precise circle) and ellipse, as the case may be) trajectory, calculates an aspect ratio of a circular portion (including true circle (precise circle) and ellipse, as the case may be) surrounded by the circular trajectory on the touch panel 13, and calculates a changed value of a sound volume setting value or the like of the speech output part 16 based on the aspect ratio.

With the above structure, a signal in response to the user operation on the touch panel 13 is sent as input information by the display/input control part 12 to the control part 11. The sent input information is decided by the control part 11. The decision result information is sent back to the display/input control part 12. Thereby, the information in response to the operation on the touch panel 13 is displayed, and data as the input information is stored in the internal/external storage device 15.

In the present embodiment, the signal in response to the user operation on the touch panel 13 is passed as the input information for the touch panel 13 via the display/input control part 12 and the control part 11 to the input information control part 14. Thereby, the input information control part 14 decides whether the user touch operation is an operation of drawing a circular trajectory, calculates an aspect ratio of a circular portion 21 surrounded by the circular trajectory, and calculates a changed value of a sound volume setting value or the like of the speech output part 16 based on the aspect ratio, thereby to display information on the touch panel 13 or to store data in the internal/external storage device 15 in a similar manner to the above.

Figure 2:
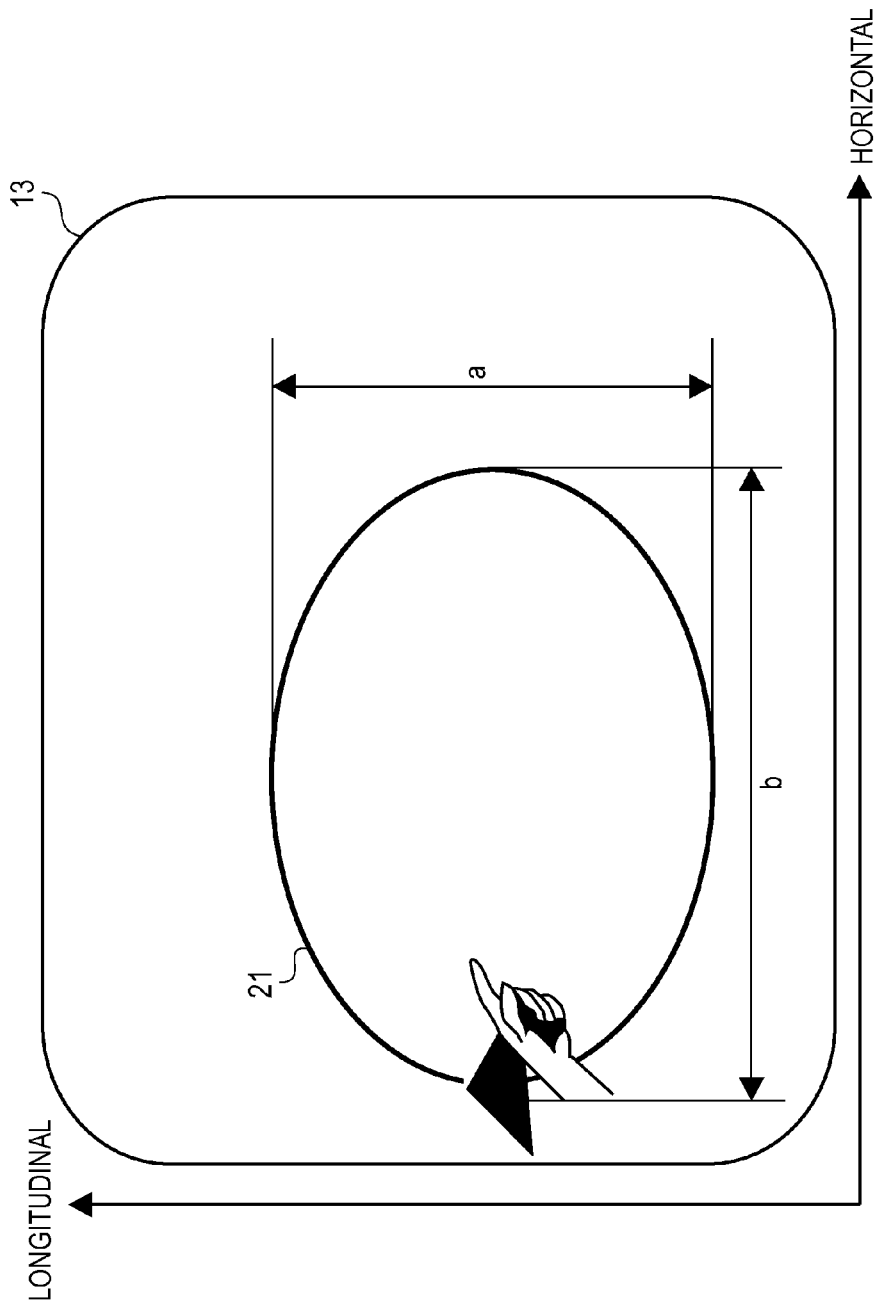
{FIG. 2} A schematic diagram explains an operation when a setting value is changed through an operation of the touch panel shown in FIG. 1.

FIG. 2 explains a mechanism of the present invention, and shows an operation of changing a setting value of a sound volume or the like through the operation of the touch panel 13 shown in FIG. 1.

In FIG. 2, when the user performs a touch operation on the touch panel 13, the input information control part 14 decides whether the operation is an operation of drawing a circular trajectory in a certain size or more. Consequently, when it is decided that the circular trajectory is drawn on the touch panel 13, the longitudinal size a of the circular portion 21 (see FIG. 2) and the horizontal size b (see FIG. 2) are detected with reference to the two mutually-orthogonal directions of the touch panel 13 (the longitudinal direction and the horizontal direction of the touch panel 13 viewed from the front) from the coordinates corresponding to the position on the touch panel 13 of the circular portion 21 surrounded by the input circular trajectory, and an aspect ratio a/b is calculated based on the detection result. Then, the control part 11 inputs the aspect ratio a/b of the circular portion 21 calculated by the input information control part 14 as control information of the terminal 1, and changes a setting value of a sound volume setting value or the like of the speech output part 16 according to the value of the aspect ratio a/b.

Figure 3:
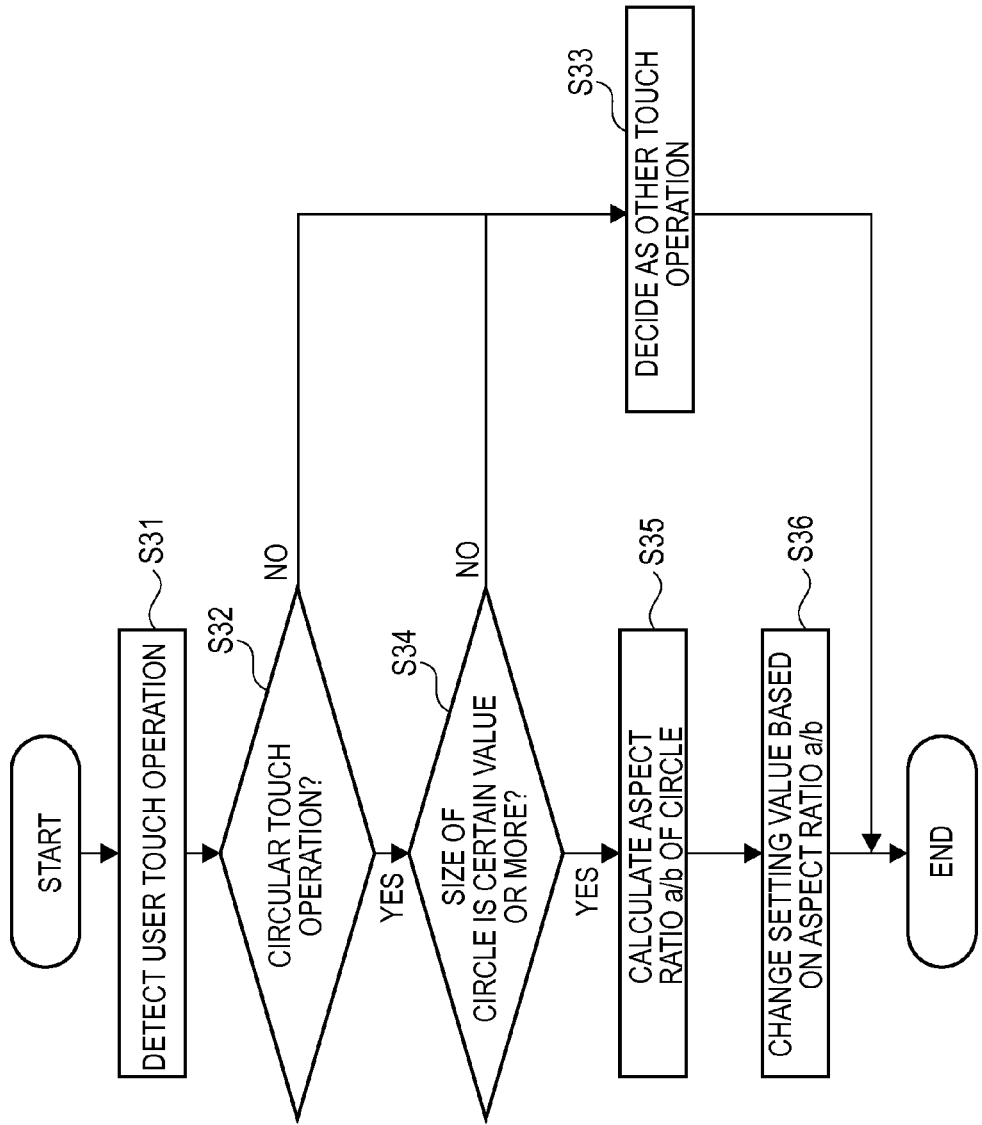
{FIG. 3} A schematic flowchart explains operations when a sound volume setting value is changed through an operation of the touch panel shown in FIG. 1.

FIG. 3 is a flowchart for explaining the operations of the terminal 1 when the sound setting value of the speech output part 16 is assumed as a setting value of the terminal 1 and the sound volume setting value is changed.

As shown in FIG. 3, when detecting the user touch operation on the touch panel 13 based on a signal from the display/input control part 12 (step S31), the control part 11 passes the information on the touch operation as the input information for the touch panel 13 to the input information control part 14. Thus, the input information control part 14 decides whether the user touch operation is a touch operation of drawing a circular trajectory (step S32) based on the input information for the touch panel 13. The decision is made by using a shape deciding method or the like based on the coordinates (X, Y coordinates) of the longitudinal direction (Y direction) and the horizontal direction (X direction) of the trajectory by the operation on the touch panel 13, for example. A software using the method is set in the memory of the input information control part 14, for example.

Consequently, when the user operation is not the touch operation of drawing a circular trajectory (step S32: NO), the input information control part 14 decides that the user operation is not the touch operation of changing a setting value but other touch operation (step S33).

On the other hand, when the user operation is the touch operation of drawing a circular trajectory (step S32: YES), the input information control part 14 decides whether the size of the circular portion 21 surrounded by the circular trajectory is a certain value or more (step S34). The decision as to the size of the circular portion 21 is made based on a sum of the longitudinal and horizontal sizes of the circular portion 21 or an area of the circular portion 21 with reference to the longitudinal direction and the horizontal direction on the touch panel 13. The decision is made by using an area calculating method or the like based on the coordinates (X, Y coordinates) of the longitudinal direction (Y direction) and the horizontal direction (X direction) of the circular trajectory forming the circular portion 21 on the touch panel 13, for example. A software using the method is set in the memory of the input information control part 14, for example. The maximum value and the minimum value of the Y coordinate are obtained, for example, and thus the longitudinal size of the circular portion 21 can be detected from the difference between both the values. Similarly, the maximum value and the minimum value of the X coordinate are obtained, for example, and thus the horizontal size of the circular portion 21 can be detected from the difference between both the values.

Consequently, when the size of the circular portion 21 is less than the preset certain value (step S34: NO), the input information control part 14 decides that the user operation is not the touch operation of changing a setting value but other touch operation (step S33).

On the other hand, when the size of the circular potion 21 is the certain value or more (step S34: YES), the input information control part 14 detects the longitudinal size a and the horizontal size b of the circular portion 21 from the coordinates (X, Y coordinates) of the longitudinal direction (Y direction) and the horizontal direction (X direction) of the circular trajectory forming the input circular portion 21, and calculates the aspect ratio a/b of the circular portion 21 (step S35). Then, the control part 11 inputs the aspect ratio a/b of the circular portion 21 calculated by the input information control part 14 as control information of the terminal 1, and changes the sound volume setting value of the speech output part 16 based on the aspect ratio a/b of the circular portion 21 (step S36).

The changed value of the sound volume setting value may be variably set depending on a magnitude of the aspect ratio a/b of the circular portion 21. For example, as shown in FIGS. 4(*a*) to 4(*d*), the sound volume is changed to be 1.5 times for a/b=1.5, twice for a/b=2, 0.5 times for a/b=0.5, and 0.25 times for a/b=0.25, respectively.

In this case, the relationship between the aspect ratio a/b and the changed value of the sound volume setting value may be changed such that when the current sound volume setting value is assumed as x and its changed value is assumed as y, y is (a/b) times of x, for example.

Alternatively, contrary to the relationship between the longitudinal and horizontal sizes of the circular portion 21, y may be changed to be (b/a) times of x by use of the reciprocal b/a of a/b.

There may be configured such that a table indicating a relationship between a/b or its reciprocal b/a and the changed value y of the sound volume setting value is previously set in the internal/external storage device 15 or the memory of the controller 11, and the control part 11 refers to the table, thereby selecting the corresponding changed value y of the sound volume setting value from the input a/b or its reciprocal b/a.

As described above, in the present embodiment, when a decision is made as to whether the trajectory by the touch operation input in the touch panel 13 is a circular motion, and when the trajectory is a circular motion, the aspect ratio a/b of the circular portion 21 is calculated, the calculated aspect ratio a/b of the circular portion 21 is input as the control information of the terminal 1, and the setting value of the sound volume or the like of the terminal 1 is changed according to the aspect ratio a/b of the circular portion 21. In this way, the setting value can be adjusted by an one-point touch operation or one-time operation and without view contact.

Thereby, in the present embodiment, there can be provided a method for controlling parameters of the sound volume and the like without a confirmation of the screen display on the touch panel provided on the display part in the electronic device such as cell phone.

In other words, according to the present embodiment, the touch operation of drawing a circular trajectory on the touch panel is performed, thereby easily changing the setting value of the sound volume or the like even in the blind state.

The above embodiment has described the case in which the portable terminal such as cell phone is used as the electronic device using a touch panel, but the present invention is not necessarily limited thereto, and any electronic devices using a touch panel may be applicable, such as portable music player or dedicated terminal capable of viewing digital books (such as digital book terminal).

The above embodiment has described the case in which the sound volume setting value is changed as the setting value of the terminal 1 which is an electronic device using a touch panel, but the present invention is not necessarily limited thereto, and any setting values of an electronic device capable of being changed by use of a touch panel are applicable.

The electronic device using a touch panel and its setting value changing method described in the above embodiment can be realized in hardware, software or a combination thereof. The hardware and software structures in this case are not particularly limited, and any structure capable of realizing the functions of the respective components may be applied. For example, circuits or parts may be independently and individually configured per function of each component or a plurality of functions may be incorporated in a circuit or part to be integrally configured.

Part of or all the embodiment may be described as the following additional notes, but is not limited thereto.

(Note 1) An electronic device including a touch panel, and a controlling unit which detects a user operation of drawing a circular trajectory on the touch panel and a size of a circular portion surrounded by the circular trajectory on the touch panel, calculates an aspect ratio of the circular portion with reference to a longitudinal direction and a horizontal direction on the touch panel, inputs the calculated aspect ratio of the circular portion as control information of the electronic device, and changes a setting value of the electronic device according to the input aspect ratio of the circular portion.

(Note 2) The electronic device according to Note 1, wherein the controlling unit calculates the aspect ratio of the circular portion when the size of the circular portion is a preset certain value or more.

(Note 3) The electronic device according to Note 2, wherein the size of the circular portion is a sum of the longitudinal and horizontal sizes of the circular portion or an area of the circular portion with reference to the longitudinal direction and the horizontal direction on the touch panel.

(Note 4) The electronic device according to any one of Notes 1 to 3, further including a speech output part, wherein the setting value of the electronic device is a sound volume setting value of the speech output part.

(Note 5) The electronic device according to Note 4, wherein a changed value of the sound volume setting value is variably set according to a magnitude of the aspect ratio of the circular portion.

(Note 6) The electronic device according to Note 5, wherein when the sound volume setting value is assumed as x, the changed value of the sound volume setting value is assumed as y, and the longitudinal and horizontal sizes of the circular portion are assumed as a and b, respectively, the controlling unit changes the y to be a/b times or b/a times of the x.

(Note 7) A setting value changing method for an electronic device using a touch panel, the method comprising: in a controlling unit, detecting a user operation of drawing a circular trajectory on the touch panel and a size of a circular portion surrounded by the circular trajectory on the touch panel, calculating an aspect ratio of the circular portion with reference to a longitudinal direction and a horizontal direction on the touch panel, inputting the calculated aspect ratio of the circular portion as control information of the electronic device, and changing a setting value of the electronic device according to the input aspect ratio of the circular portion.

(Note 8) The setting value changing method for an electronic device according to Note 7, wherein the controlling unit calculates the aspect ratio of the circular portion when the size of the circular portion is a preset certain value or more.

(Note 9) The setting value changing method for an electronic device according to Note 8, wherein the size of the circular portion is a sum of the longitudinal and horizontal sizes of the circular portion or an area of the circular portion with reference to the longitudinal direction and the horizontal direction on the touch panel.

(Note 10) The setting value changing method for an electronic device according to any one of Notes 7 to 9, wherein the electronic device is provided with a speech output part and the setting value of the electronic device is a sound volume setting value of the speech output part.

(Note 11) The setting value changing method for an electronic device according to Note 10, wherein a changed value of the sound volume setting value is variably set according to a magnitude of the aspect ratio of the circular portion.

(Note 12) The setting value changing method for an electronic device according to Note 11, wherein when the sound volume setting value is assumed as x, the changed value of the sound volume setting value is assumed as y and the longitudinal and horizontal sizes of the circular portion are assumed as a and b, respectively, the controlling unit changes the y to be (a/b) times or (b/a) times of the x.

(Note 13) A portable terminal configured of the electronic device according to any one of Notes 1 to 6.

(Note 14) A portable music player configured of the electronic device according to any one of Notes 1 to 6.

The present invention of the present application has been described above with reference to the embodiment, but the present invention is not limited to the above embodiment. Various modifications understood by those skilled in the art may be made to the structure and details of the present invention within the scope of the present invention.

The present application claims the priority based on Japanese Patent Application 2009-215633 filed on Sep. 17, 2009, the disclosure of which is all incorporated by reference herein.

{Industrial Applicability}

As described above, the present invention is applicable to electronic devices such as portable terminal and portable music player using a touch panel.

{Reference Signs List}

1: Terminal (electronic device)
11: Control part
12: Display/input control part
13: Touch panel
14: Input information control part
15: Internal/external storage device
16: Speech output part
21: Circular portion

The invention claimed is:

1. An electronic device comprising:
    a touch panel; and
    a controlling unit configured i) to detect a user operation of drawing a circular trajectory using a single contact point on the touch panel, the circular trajectory including a true circular trajectory and an elliptic trajectory; ii) to determine a size of a circular portion surrounded by the circular trajectory on the touch panel; iii) to calculate an aspect ratio of the circular portion surrounded by the circular trajectory of the single contact point with reference to a longitudinal direction and a horizontal direction on the touch panel, the aspect ratio being a ratio of a longitudinal size of the circular portion to a horizontal size of the circular portion; iv) to input the calculated aspect ratio of the circular portion as control information of the electronic device; and v) to change a setting value of the electronic device according to the input aspect ratio of the circular portion.

2. The electronic device according to claim 1, wherein the controlling unit is further configured to calculate the aspect ratio of the circular portion when the size of the circular portion is a preset certain value or more.

3. The electronic device according to claim 2, wherein the size of the circular portion is a sum of the longitudinal and horizontal sizes of the circular portion or an area of the circular portion on the touch panel.

4. The electronic device according to claim 1, further comprising a speech output part, wherein the setting value of the electronic device is a sound volume setting value of the speech output part.

5. The electronic device according to claim 4, wherein a changed value of the sound volume setting value is variably set according to a magnitude of the aspect ratio of the circular portion.

6. The electronic device according to claim 5, wherein when the sound volume setting value is assumed as x, the changed value of the sound volume setting value is assumed as y, and the longitudinal and horizontal sizes of the circular portion are assumed as a and b, respectively, the controlling unit changes the y to be a/b times or b/a times of the x.

7. A setting value changing method for an electronic device using a touch panel, the method comprising:
   in a controlling unit, detecting a user operation of drawing a circular trajectory on the touch panel and determining a size of a circular portion surrounded by the circular trajectory using a single contact point on the touch panel, the circular trajectory including a true circular trajectory and an elliptic trajectory;
   calculating an aspect ratio of the circular portion surrounded by the circular trajectory of the single contact point with reference to a longitudinal direction and a horizontal direction on the touch panel, the aspect ratio being a ratio of a longitudinal size of the circular portion to a horizontal size of the circular portion;
   inputting the calculated aspect ratio of the circular portion as control information of the electronic device; and
   changing a setting value of the electronic device according to the input aspect ratio of the circular portion.

8. The setting value changing method for an electronic device according to claim 7, wherein the calculating in the controlling unit comprises calculating the aspect ratio of the circular portion when the size of the circular portion is a preset certain value or more.

9. The setting value changing method for an electronic device according to claim 8, wherein the size of the circular portion is a sum of the longitudinal and horizontal sizes of the circular portion or an area of the circular portion on the touch panel.

10. The setting value changing method for an electronic device according to claim 7, wherein the electronic device is provided with a speech output part, and the setting value of the electronic device is a sound volume setting value of the speech output part.

11. The setting value changing method for an electronic device according to claim 10, wherein a changed value of the sound volume setting value is variably set according to a magnitude of the aspect ratio of the circular portion.

12. The setting value changing method for an electronic device according to claim 11, wherein when the sound volume setting value is assumed as x, the changed value of the sound volume setting value is assumed as y, and the longitudinal and horizontal sizes of the circular portion are assumed as a and b, respectively, the changing in the controlling unit comprises changing the y to be (a/b) times or (b/a) times of the x.

13. A portable terminal comprising the electronic device according to claim 1.

14. A portable music player comprising the electronic device according to claim 1.

15. An electronic device, comprising:
   a control part comprising a computer processor;
   a speech output part; and
   a touch panel operatively connected to the control part and specifying a user's finger contact with the touch panel, wherein,
   the control part is operatively connected to the touch panel to detect a user operation forming a circular trajectory drawing using a single contact point on the touch panel,
   when the control part detects that the circular trajectory drawing corresponds to an ellipse, the control part is further operative, when the ellipse is a circular ellipse, i) to calculate a longitudinal size of the ellipse of the single contact point, ii) to calculate a horizontal size of the circular ellipse of the single contact point, and iii) based on a ratio of the calculated longitudinal size to the calculated horizontal size, to calculate an aspect ratio of the ellipse of the single contact point, the longitudinal size and the horizontal size being detected with reference to two mutually-orthogonal directions of the touch panel, and
   the control part is operatively connected to the speech output part to input the calculated aspect ratio as control information of the electronic device, and then to change a sound setting value of the electronic device according to the input calculated aspect ratio.

16. The electronic device of claim 15, wherein,
   when the calculated aspect ratio is greater than 1, the control part increases the sound setting value to increase sound from the speech output part, and
   when the calculated aspect ratio is less than 1, the control part decreases the sound setting value to decrease sound from the speech output part.

17. The electronic device of claim 15, wherein,
   when the calculated aspect ratio is greater than 1, the control part changes the sound setting value to change sound from the speech output part in a first magnitude direction, and
   when the calculated aspect ratio is less than 1, the control part changes the sound setting value to change sound from the speech output part in a second magnitude direction opposite to in the first magnitude direction.

18. The electronic device of claim 15, wherein the electronic device is a portable terminal.

19. The electronic device of claim 18, wherein the electronic device is a portable terminal.

20. The electronic device of claim 15, wherein the electronic device is portable music player.

* * * * *